Patented Oct. 16, 1945

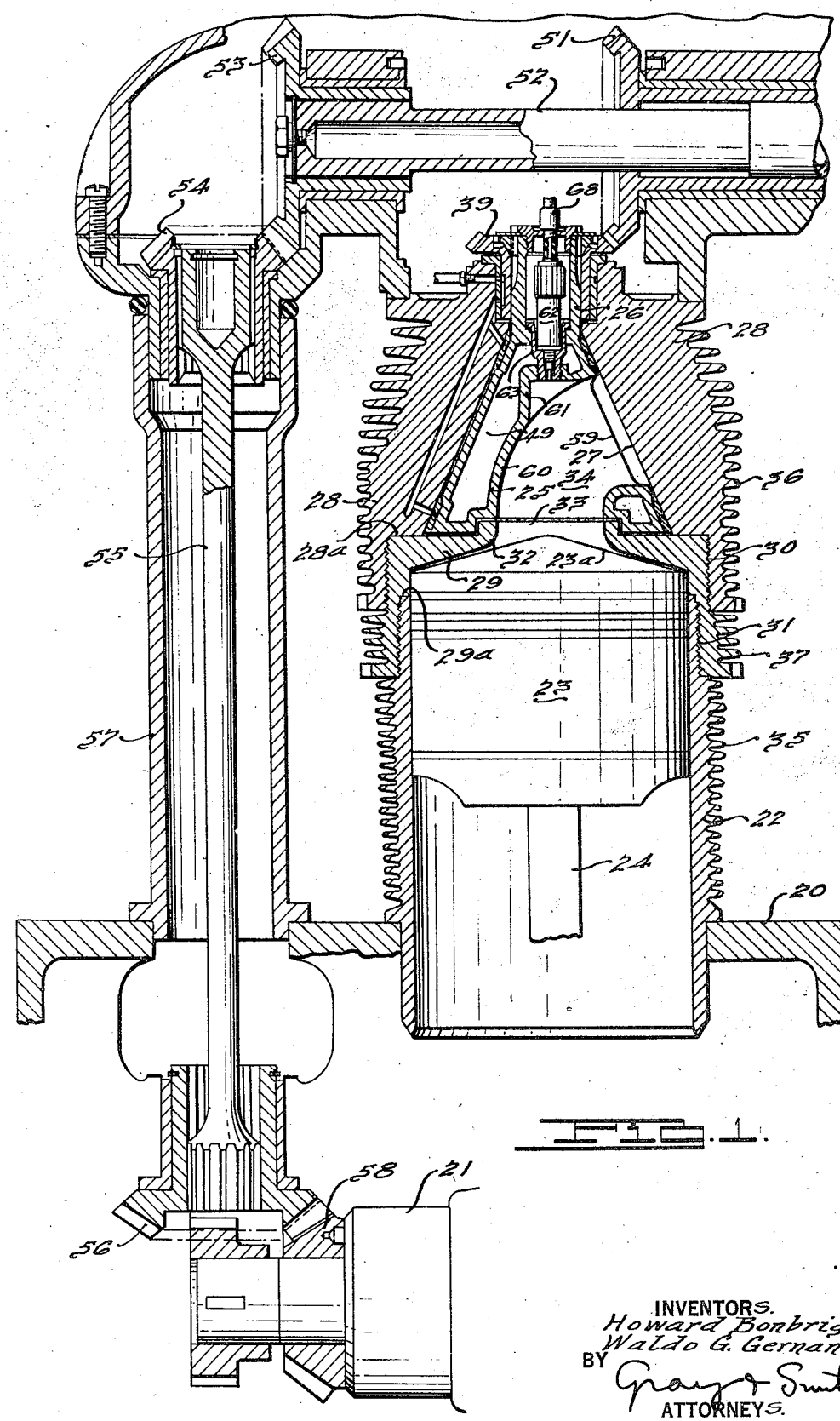

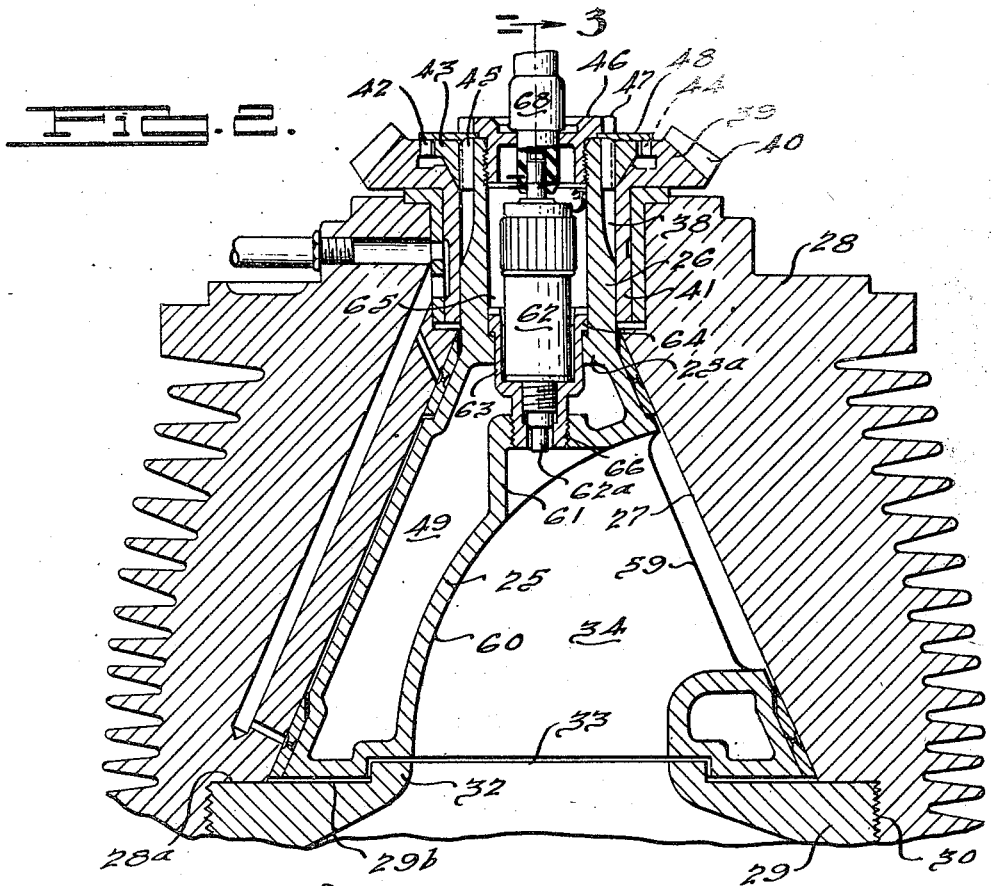
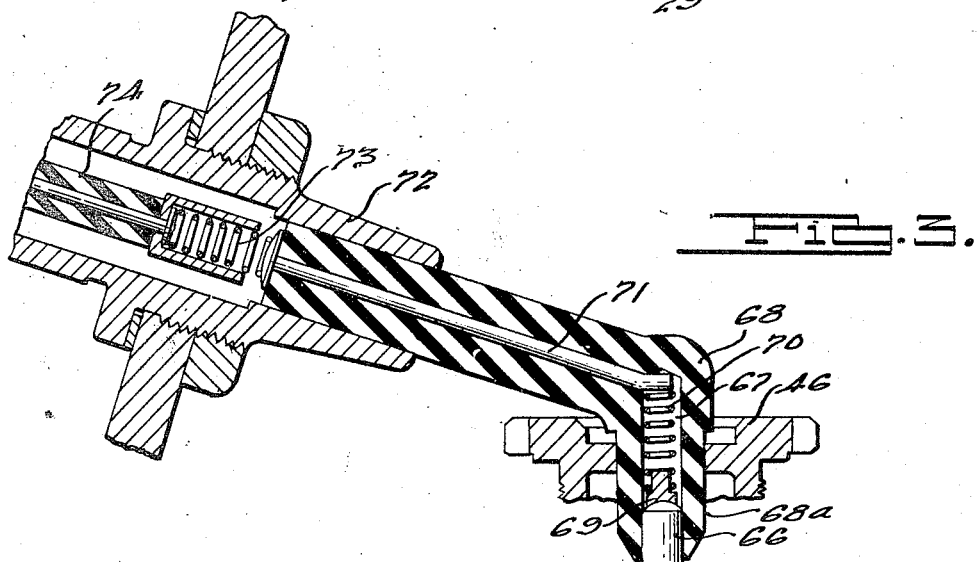

2,387,114

UNITED STATES PATENT OFFICE 2,387,114

ENGINE

Howard Bonbright, Grosse Pointe, and Waldo G. Gernandt, Detroit, Mich., assignors to Briggs Manufacturing Company, Detroit, Mich., a corporation of Michigan Application May 2, 1942, Serial No. 441,522

18 Claims. (Cl. 123—80)

This invention relates to internal combustion engines and more particularly to an engine of the spark-ignition type having a rotatable valve in the head thereof.

The invention is particularly applicable to engines of the type having a rotatable valve driven in properly timed relation to the engine drive shaft and preferably, although not necessarily, of the kind which rotates continuously in one direction. Also the invention is especially applicable to an internal combustion engine of the foregoing kind in which the rotatable valve or rotor mounted in the cylinder head is formed with substantially all or at least the major portion of the combustion space and is generally conical or frusto-conical in shape. In the preferred embodiment of the invention the combustion chamber in the valve has an opening or port in the side of the valve adapted to communicate with an intake or exhaust passage, or both as the case may be, and also an opening at the inner end or bottom of the valve leading to the cylinder, the combustion chamber otherwise being entirely enclosed or housed within the valve member.

In the construction of an engine of this type it is preferred that the valve member or rotor be constructed substantially frusto-conical in shape with the combustion chamber closed off from the outer end of the valve, which end is preferably in the form of a stem to which the valve driving and supporting mechanism is operatively connected. Also it is preferred that the combustion chamber within the rotor be formed with smoothly curving walls between the ports in the rotor. Fuel may be supplied to the engine either by the injection or carburetor, the former being preferred in the present engine in order to ensure stratification of the charge within the combustion chamber in the valve.

An object of this invention is to provide an internal combustion engine having a rotatable valve chambered to form a portion of the combustion space and having an ignition device carried by the valve.

A further object of the invention is to provide an internal combustion engine having a rotatable generally frusto-conical valve which includes within its walls a substantial portion and preferably most of the combustion space, and in which improved combustion, flame propagation and greater efficiency is achieved by mounting an ignition device on and adjacent the narrower end of the valve.

Still another object of the invention is to provide an internal combustion engine having a rotatable valve chambered to form preferably the greater portion of the combustion space and having an ignition device rotatable with the valve and adapted to produce a spark within that portion of the valve chamber where the mixture tends to be richest.

Another object of the invention is to provide an engine having a rotatable generally frusto-conical valve in the head thereof, the valve having a stem adapted to be connected to driving mechanism for the valve, and in which an ignition device, such as a spark plug, is located in the valve stem and is adapted to rotate with the valve and fire the mixture in a combustion chamber within the valve.

A further object of the invention is to provide an internal combustion engine with a cone type valve, a spark plug in the stem of the valve, and a cooling chamber in the valve effective not only to dissipate heat from the valve combustion chamber but also to assist in cooling the spark plug.

The present engine preferably utilizes a generally frusto-conical valve or rotor with a combustion chamber entirely confined within the walls of the valve, excepting for a port leading to the cylinder and a port adapted to communicate with the intake or exhaust passage. The combustion chamber is so shaped and arranged in the valve or rotor that the charge, according to our belief, is somewhat stratified, namely, a stratum of relatively dense fuel particles is formed near the top of the valve chamber producing in this region a richer mixture than at the side of the chamber where the port is the valve is located. The spark plug is, therefore, located so as to produce a spark at the locality of this relatively dense stratum of fuel, and as a consequence slower flame propagation, more complete burning of the fuel and much less loss occurs, while pre-ignition is very nearly eliminated.

Other objects of this invention will appear in the following description and appended claims, reference being had to the accompanying drawings forming a part of this specification wherein like reference characters designate corresponding parts in the several views.

Fig. 1 is a fragmentary sectional elevation illustrating a portion of a multi-cylinder engine embodying the present invention.

Fig. 2 is an enlarged fragmentary sectional elevation illustrating particularly the exhaust, cylinder head and rotary valve structure shown in Fig. 1.

Fig. 3 is an enlarged section taken substantially through lines 3—3 of Fig. 2 looking in the direction of the arrows.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

In the drawings there is illustrated, by way of example, one embodiment of the invention as applied to an internal combustion engine of the spark ignition type designed particularly for the power plant of an aircraft. The invention may obviously be embodied in engines for other purposes, such as automotive, marine and industrial engines. For most uses the engine is of the multi-cylinder type, although any number of cylinder units may be employed in any given engine. In the present embodiment, for the purposes of simplicity, a single cylinder unit of the engine is illustrated, it being understood that the remaining cylinders of the engine are identical to the structure herein shown and described.

Referring to Fig. 1, the present engine comprises a suitable crankcase 20 within which is mounted a crankshaft 21 supported in bearings according to conventional practice. A cylinder 22 is secured rigidly to the crankcase and has its lower or inner end projecting thereinto. Mounted to reciprocate within the cylinder is a piston 23 adapted to be connected in the usual manner by a connecting rod 24 to the crankshaft 21.

In the present engine the combustion chamber of the cylinder is formed principally within a rotor or rotary member 25, this member comprising a frusto-conical body arranged immediately above the piston when at the top of its stroke and also having a cylindrical stem 26 projecting from the outer end of the rotor body. The rotor 25 fits within a correspondingly shaped substantially frusto-conical cavity 27 in an upper cylinder head member 28. The cylinder head of the engine may be said to comprise two portions or members secured together and to the upper end of the cylinder 22. In addition to the outer member 28 the cylinder head comprises an intermediate member 29 which may herein be termed the rotor mask or shield and forming the pressure control member for the rotor and head and also the throat opening from the cylinder into the combustion chamber.

The upper or outer end of the cylinder is formed with external threads which are engaged by internal threads on the cylindrical skirt portion of the head member 29 as indicated at 31. The member 29 in turn is provided with external threads which are engaged by internal threads on the cylindrical skirt portion of the outer cylinder head member 28, as indicated at 30. From this construction it will be seen that the cylinder head or mask member 29 may be screwed down tightly over the outer end of the cylinder 22 until the annular shoulder 29a of the member 29 substantially abuts against or engages the upper or outer edge of the cylinder, as shown in Figs. 1 and 2. Also it will be seen that the outer cylinder head member 28 is screwed down tightly over the member 29 until the bottom shoulder 28a of the head 28 substantially engages or abuts against the upper flat ledge or face 29b of the mask member or fire plate 29.

The rotor mask or shield 29 terminates centrally in a projecting annular flange 32 which forms the throat opening 33 into the combustion chamber 34 of the rotor member or rotary valve 25. The piston 23 is preferably formed at its outer end with a tapered portion 23a, as illustrated in Fig. 1, which projects into the throat opening 33, thereby reducing the size of the combustion space and preferably confining the combustion chamber substantially to the space within the rotor 25. The piston at the top of its stroke, as shown in Fig. 1, preferably has only a minimum operating clearance with the bottom correspondingly tapered wall of the mask or fire plate 29.

The present engine is illustrated as being air cooled and, accordingly, the cylinder 22 is provided with projecting fins 35. Cooling fins 36 and 37 are also provided on the cylinder head members 28 and 29, respectively. It will be understood that the present invention is not limited to an air cooled engine as it will be apparent that any effective cooling system may be utilized.

The rotor 25 is driven through the medium of the stem 26 which is positively connected to a driving gear in such manner as to permit slight relative axial and radial movement between the driving gear and the rotor. The stem 26 of the rotor is provided with external longitudinal splines 38 and is also provided with internal threads within the cylindrical bore thereof. The rotor is driven by a gear 39 having suitable gear teeth 40, this gear being formed with a depending cylindrical hub or sleeve 41 having a sliding fit over the stem 26. The gear 41 also has internal tooth-like splines 42. A coupling member 43 fits within the annular space formed between the teeth 42 of the driving gear 39, this coupling member having exterior teeth or splines 44 fitting into the spaces between the splines 42 of the driving gear and also having internal splines 45 fitting within the spaces formed by the splines 38 of the stem 26. The coupling member 43 has an annular tapered surface engageable with a correspondingly shaped tapered surface 39a of the gear 39. 46 is a clamping nut having external threads engageable with the threads of the valve stem 26 and having an outwardly projecting hex formed flange 47. Interposed between this flange and the end of the stem 26 is a spring washer 48 having a central aperture through which the clamping nut projects, the washer being of a sufficient diameter to engage the upper face of the gear 39, as shown in Fig. 2.

The rotor body 25 is cored entirely around the combustion chamber 34 to provide a cavity 49. Any suitable heat transfer or conducting medium, such as metallic sodium, is introduced into the cavity 49 through the hollow stem 26, and sealed therein by a screw plug in a manner hereinafter described.

Referring to Fig. 1, the gear 39, which is attached to the projecting stem of the rotor 25, is driven through the medium of a gear 51 attached to a top horizontal shaft 52. This shaft is of the desired length to permit simultaneous driving of the rotors of a plurality of cylinders arranged in line. Attached to the end of the shaft 52 is a gear 53 which is driven by a gear 54 secured to the upper end of a tower shaft 55. This shaft is suitably housed at 57 and has secured to the lower end thereof a gear 56 which is driven through the medium of a gear 58 attached to the crankshaft 21.

It will be seen that in the particular embodiment herein illustrated the rotor or valve 25 has a single port 59 in its side communicating with the combustion chamber 34 adapted to register in succession with an intake port and an exhaust port (not shown) in the cylinder head such, for example, as shown in copending application Ser. No. 433,316. In this embodiment, therefore, the valve or rotor 25 is driven at one-half engine or crankshaft speed. The driving mechanism, above described and shown in the drawings, is illustrative of a suitable mechanism by which one or a plurality of rotary valves for a corresponding plurality of cylinders may be driven from the crankshaft.

The curved wall 60 of the combustion chamber 34 is formed near the top of the chamber with an offset portion 61 forming a recess into which projects the terminal 62a of a spark plug 62. This spark plug may be of conventional type, such as the kind used frequently in connection with aircraft engines. It comprises a cylindrical body which is seated within the hollow receptacle portion of a plug member 63. This member has a cylindrical body, hollow to receive the spark plug, which body extends through an opening in the upper wall 25a of the valve 25. This wall separates the cavity 49 in the valve from the passage 65 formed in the stem 26 of the valve. The receptacle plug member 63 terminates at its upper end in an annular flange 64 which fits within the correspondingly shaped passage 65 in the valve stem and is drawn down tightly against a shoulder formed by the wall 25a when the reduced end 66 of the plug member 63 is screwed into a tapped hole in the upper wall of the offset portion 61 of the valve. Thus, after the introduction of metallic sodium into the cavity 49 through the passage 65 in the valve stem the plug 63 is threaded into position so as to close off communication between the cavity 49 and the passage 65 in the valve stem. From this construction it will be seen that the spark plug is separated from direct contact with the cooling medium within the chamber or cavity 49 by means of the receptacle plug member 63, yet since the latter is exposed to the cooling medium within the cavity 49 it will assist in dissipating heat from the spark plug.

The spark plug 62 terminates at its upper end in a pilot or terminal 62b which projects into and is rotatable within a cylindrical passage or hole 67 formed in one projecting end 68a of a retaining member 68, this member being formed of any suitable insulating material. The projecting portion 68a of the retainer member 68 extends through a hole in the cap 46 and, as illustrated in Fig. 3, embraces the terminal 62b of the spark plug. This terminal engages a contact member 69 which is held in position by a compression spring 70. The upper end of this spring engages a conductor 71 extending through the upper arm of the retainer member 68, this arm being supported in a fixed adapter 72 carried by the upper drive shaft housing. The conductor 71 in turn contacts a spring 73 which engages a conductor 74 connected to a source of electricity.

From the foregoing it will be seen that the spark plug 62 is housed in part within the stem 26 of the frusto-conical valve 25 and is mounted in the upper end of the valve so as to produce a spark for ignition purposes at a point near the top or outer end of the combustion chamber 34. The spark plug rotates with the valve and is supplied with electric current through the conducting elements 69, 70, 71, 73 and 74. It will be seen that the spark plug retainer member 68 is held in fixed position against rotation and is designed so as to permit the valve 25, including the cap 46 at the upper end of the valve, and the spark plug 62 to rotate relative thereto.

We claim:

1. In an internal combustion engine having a cylinder head, a rotatable valve in said head having converging surfaces and provided with a chamber forming a large portion of the combustion space, and an ignition device carried by spaced walls of said valve and rotatable therewith.

2. In an internal combustion engine having a cylinder head, a rotatable valve in said head having converging surfaces and provided with a chamber forming a large portion of the combustion space, and an ignition device extending through spaced walls of said valve adjacent the narrower end thereof and rotatable therewith.

3. In an internal combustion engine having a cylinder head, a rotatable valve in said head having outwardly converging surfaces and provided with a chamber forming a large portion of the combustion space, and an ignition device extending through spaced walls of said valve at the outer end thereof and rotatable therewith.

4. In an internal combustion engine having a cylinder head, a rotatable frusto-conical valve in said head having a combustion chamber and spaced walls, and a spark plug carried by said valve and extending through said walls.

5. In an internal combustion engine having a cylinder head, a rotatable frusto-conical valve in said head having a combustion chamber and spaced walls, and a spark plug extending through said walls at the axis of rotation thereof and rotatable with the valve.

6. In an internal combustion engine having a cylinder head, a rotatable frusto-conical valve in said head having a combustion chamber, and a spark plug mounted in spaced walls of said valve at the axis of rotation thereof and rotatable therewith.

7. In an internal combustion engine, a rotatable valve having a combustion chamber, the walls of said valve around said chamber being spaced to provide a cavity for a cooling medium, and a mounting for an ignition device carried by said valve and exposed to said cavity.

8. In an internal combustion engine, a rotatable valve having a combustion chamber, the walls of said valve around said chamber being spaced to provide a cavity for a cooling medium, and a mounting for an ignition device carried by said valve and extending through a portion of said cavity.

9. In an internal combustion engine, a rotatable valve having a combustion chamber, the walls of said valve around said chamber being spaced to provide a cavity for a cooling medium, and a mounting for an ignition device carried by said valve at the axis of rotation thereof and exposed to said cavity.

10. In an internal combustion engine, a rotatable valve having a combustion chamber, the walls of said valve around said chamber being spaced to provide a cavity for a cooling medium, and a mounting for an ignition device carried by said valve at the axis of rotation thereof and extending into a portion of said cavity.

11. In an internal combustion engine, a rotatable frusto-conical valve having a combustion chamber, the walls of said valve around said chamber being spaced to provide a cavity for a cooling medium, and a mounting for an ignition device carried by said valve and exposed to said cavity.

12. In an internal combustion engine, a rotatable valve having converging walls and a combustion chamber between said walls, said valve terminating in a hollow stem, and a spark plug extending through said hollow stem and rotatable therewith, said valve having a cooling chamber extending around the combustion chamber and said spark plug extending through a portion of said cooling chamber.

13. In an internal combustion engine, a rotatable valve having a combustion chamber, an ignition device, and a common means for cooling said combustion chamber and ignition device.

14. In an internal combustion engine, a rotatable valve having a combustion chamber bounded at least in part by spaced walls, and an ignition device mounted in said spaced walls.

15. In an internal combustion engine, a rotatable valve having a combustion chamber bounded at least in part by spaced walls, and an ignition device mounted in said spaced walls at the axis of rotation of the valve.

16. In an internal combustion engine, a rotatable frusto-conical valve having a combustion chamber bounded at least in part by spaced walls, and an ignition device mounted in said spaced walls at the narrower end of the valve and rotatable therewith.

17. In an internal combustion engine, a rotatable valve having a combustion chamber and a hollow stem, an ignition device rotatable with the valve and extending through said stem and spaced from the wall thereof, and a mounting for the device having a portion forming with said ignition device a closure for the inner end of the hollow stem and having another portion secured to the upper wall of said combustion chamber.

18. In an internal combustion engine, a rotatable valve having an outer tapering wall and a combustion chamber, said wall having a side port communicating with said chamber and the latter having a continuous curved roof wall extending from a port in the inner end of the valve to the upper edge portion of said side port, an ignition device rotatable with the valve and extending within the outer end of the valve at the axis of rotation thereof, and means for securing the ignition device in an opening in said wall intermediate said ports.

HOWARD BONBRIGHT.
WALDO G. GERNANDT.